Figure 1:
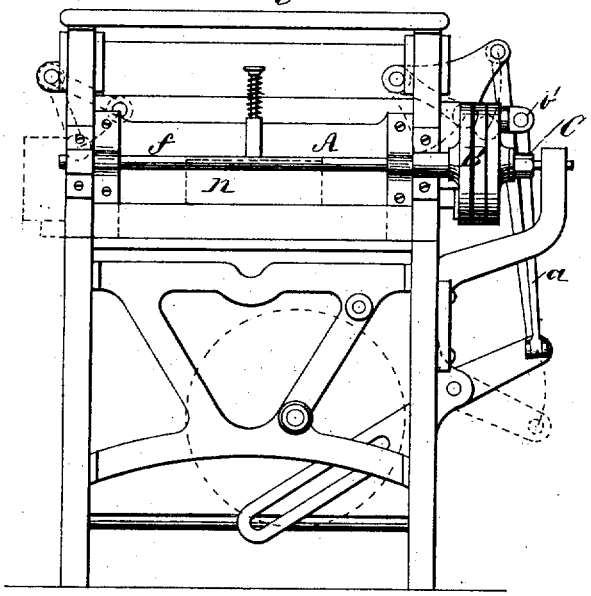

E. SCHLENKER.

Assignor of one-half interest to R. L. Howard.

PAPER-CUTTING MACHINE.

No. 7,612. Reissued April 17, 1877.

Witnesses.

P. P. Burts

Henry Buck

Inventor.

Eckard Schlenker

N. PETERS, PHOTO-LITHOGRAPHER, WASHINGTON, D. C.

UNITED STATES PATENT OFFICE

ERHARD SCHLENKER, OF BUFFALO, NEW YORK, ASSIGNOR OF ONE-HALF INTEREST TO RUFUS L. HOWARD.

IMPROVEMENT IN PAPER-CUTTING MACHINES.

Specification forming part of Letters Patent No. 182,230, dated September 12, 1876; reissue No. 7,612, dated April 17, 1877; application filed March 12, 1877.

*To all whom it may concern:*

Be it known that I, ERHARD SCHLENKER, of Buffalo, in the county of Erie and State of New York, have invented certain new and useful Improvements in Paper-Cutting Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My improvements can be attached to ordinary paper-cutting machines in any convenient or desirable position, and be operated by any suitable mechanism connected with and receiving power from the mechanism employed to operate said paper-cutting machine.

The invention consists in the employment of certain devices which operate through friction, so as to move a clamp device against the paper to be cut, and hold it firmly in position while the cutting-knife passes through the paper, the pressure of the clamp upon the paper being uniform, irrespective of variation in the thickness of paper to be cut, and when the requisite degree of pressure is exerted upon the clamp, it is released from its actuating mechanism, in order that increased pressure may be exerted upon the cutting-knife without affecting the clamp, as hereinafter more fully set forth.

It also consists in the employment of certain devices operating through friction to raise the clamp device above the paper without undue expenditure of force, the frictional force employed being only sufficient to raise the clamp and hold it in an elevated position, as hereinafter more fully set forth.

The invention further consists in the employment of an indicating device attached to the clamp, and by means of which the operator can ascertain the exact line upon which the knife will cut before applying the power to the knife.

By the accompanying drawings I have shown a method by which my improvements are applied to a paper-cutting machine of ordinary construction, a shaft having segmental gears being employed to transmit motion from the frictional devices to the paper-clamp, the motive power being derived from the mechanism which operates the cutting-knife.

Without being understood as confining myself to this particular method of connecting the frictional devices with the clamp, I now proceed to describe the machine illustrated by the drawing.

Figure 3:
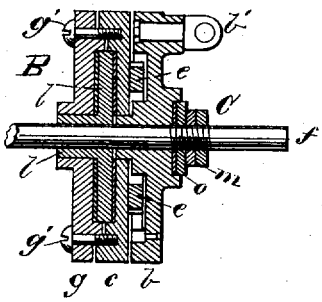
Figure 4:
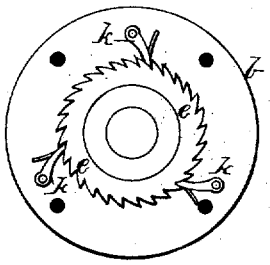
Figure 2:
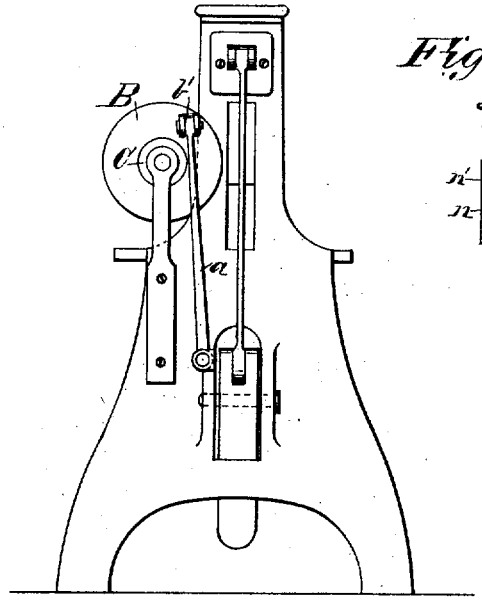
Figure 6:
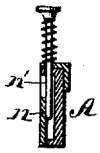
Figure 5:
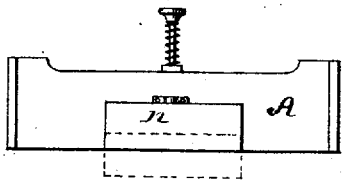
Figure 7:
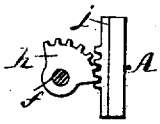

In the accompanying drawings, Figure 1 is an elevation of a paper-cutting machine having my improvements attached thereto. Fig. 2 is an end view or side elevation of the same. Fig. 3 is a vertical sectional view of the frictional devices. Fig. 4 is an elevation of one of the plates of the friction device. Fig. 5 is a detached view of the paper-clamp, showing the indicating device attached thereto. Fig. 6 is a vertical sectional view of same. Fig. 7 is a detached view of the rack and segmental gear which forms the connection between the paper-clamp and the shaft of the frictional device.

My invention being confined to the improved devices for operating the paper-clamp, and the indicating device before referred to, it is not thought necessary to describe the construction of the paper-cutting machine itself, and I therefore confine the description to the improvements made by me.

Referring to the parts by letters, A represents the paper-clamp; B, the frictional device by means of which the clamp is moved against the paper, and held in position with uniform pressure while the paper is being cut; and C represents the frictional device employed to raise the clamp and hold it in an elevated position until again moved down upon the paper through the agency of the device B.

The frictional device or clutch B consists, first, of a plate, *b*, having on its inner face three pawls, *k*, which are pivoted to the plate and held in place by springs, in the usual manner; second, a plate, *c*, having ratchet-teeth *e* on its face, which is next to the plate *b*; the opposite side of the plate *c* is formed with an annular recess; third, a plate, *g*, the inner face of which is formed with an annular recess corresponding with the recess in the plate *c*. In the chamber formed by these annular concavities is, fourth, a plate, *l*, which is keyed to a shaft, *f*, the shaft passing through all the plates of the frictional device, as clearly shown by Fig. 3 of the drawings. Between the plate *l* and the plates *c* and *g*, leather or other suitable yielding material is inserted, and the plates *g* and *c* are united, so as to clamp the plate *l* by means of screw-bolts *g'*. The plates *b*, *c*, and *g* are loosely mounted, so that they do not necessarily turn with the shaft *f*, while the plate *l*, being keyed to the shaft, must turn with it. *b'* is a projection or lug on the outer face of the plate *b*, by means of which the device may be connected with any of the operating parts of the paper-cutting machine. In Figs. 1 and 2 it is shown as connected by a rod, *a*, to the lever, which transmits motion to the cutting-knife.

The frictional device C, for raising and suspending the clamp A, consists of a disk or washer, *o*, which partially fits within an annular recess formed in the outer face of the plate *b*. It is secured to the shaft *f* and held in place by a nut and jam-nut, *m*, leather or other suitable yielding material being inserted between the plates *o* and *b*, as clearly shown in Fig. 3 of the drawings.

The shaft *f* is journaled in suitable bearings, and extends across the machine.

*h* represents small segment-gears, which are keyed to the shaft *f*, and gear with corresponding rack-bars *j*, which are secured to the clamp A.

*n* represents a small plate of thin metal, which is made to slide up and down within a recess, *n'*, formed in the inner face of the clamp A. It is attached to a stem, which passes up through the clamp, said stem being encircled by a spring, as clearly shown by Figs. 5 and 6 of the drawings.

The operation of the several devices is as follows:

It will be seen that a close frictional contact is formed between the plate *l* and the plates *c* and *g* by means of the screw-bolts *g'*, and the leather or other suitable yielding material interposed between the plates.

It will also be obvious that the degree of frictional pressure thus obtained can be increased or decreased, at the will of the operator, by simply tightening up or loosening the bolts *g'*. The necessary or requisite degree of pressure of the paper-clamp upon the paper to be cut can therefore be adjusted in this way.

When properly adjusted, the device is ready for use, and operates as follows: A partial rotation being imparted to the plate *b* through its connection with the operating mechanism of the machine, said movement, being as yet unresisted, will also be imparted, through the ratchet *e* and pawl *k*, to the plates *c* and *g*, and through their clamping closely on the plate *l*, which is keyed to the shaft *f*, the latter will also receive the motion, and through its segmental gears *h* and the rack-bars *j* upon the paper-clamp A, the latter will be brought down upon the paper to be cut, and be held in that position with the required degree of pressure, corresponding with the friction established between the plates *c*, *g*, and *l* of the frictional device B, but with no greater degree of pressure, because the continued motion of the lever which operates the cutting-knife, and the consequent revolution of the plate *b*, does not increase the friction between the plates *c*, *g*, and *l*, and, therefore, the full power is permitted to be exerted upon the cutting-knife.

It will thus be obvious that the shaft *f* will only rotate sufficiently far to bring the paper-clamp firmly against the paper, and the force required to cut the paper being much greater, it overcomes the resistance due to the friction between the plates *l c g*, so that the two latter continue to move with the plate *b*, while the plate *l* and shaft *f* remain stationary.

As a result, it is obvious that, whether a single sheet or considerable thickness of paper is to be cut, the clamp will continue its movement until brought into contact with it with sufficient pressure to hold it in position, and that no increase of pressure and consequent loss of power is exerted upon it through the continued motion of the other operating parts of the machine while the paper is being cut.

On the reverse movement the plate *b* will revolve freely without moving the plates *c* and *g*, the pawls *k* slipping over the teeth of the ratchet *e*.

The plate *o* of the frictional device C being, however, held in sufficiently close frictional contact with the plate *b*, the shaft *f* will be turned sufficiently far to raise the clamp A, and said frictional contact between plates *o* and *b* will be sufficient to hold it in an elevated position until again brought down through the operation of the frictional device B.

In this way it will be seen that no more force is employed or power expended than is sufficient to overcome the weight of the clamp-bar A.

To ascertain the exact line upon which the knife will cut, it is only necessary to press down the indicator *n*, attached to the clamp A, before applying the power to the knife, the knife being located immediately behind the indicator. By this means the position of the paper may be accurately adjusted before it is cut. By removing the pressure of the hand from the stem of the indicator the spring will raise it to its normal position.

Having thus described my invention, what I claim as new, and desire to secure by Letters Patent, is—

1. A frictional device, B, arranged to operate in combination with the clamp-bar of a paper-cutting machine, so as to move said clamp against the paper to be cut, and hold the same with uniform pressure, and then be released from further pressure of the actuating mechanism, so that the increased pressure may be exerted upon the cutting-knife without affecting the clamp, substantially as set forth.

2. A frictional device, C, arranged to operate in combination with the clamp-bar of a paper-cutting machine, so as to raise and suspend the same above the paper, and then be released from further pressure of the actuating mechanism, so as not to interfere with or use up the power required to operate, the other parts of the machine, substantially as set forth.

3. The combination of the clamp A with the shaft *f* and connecting-rod *a*, and with the frictional clutch mechanisms B and C, substantially as and for the purpose specified.

4. The plates *b*, *c*, *g*, and *l*, arranged to operate in combination with the shaft *f* and clamp A, substantially as and for the purpose specified.

5. The disk or plate *b*, washer *o*, and jam-nut *m*, arranged to operate in combination with the shaft *f* and clamp A, substantially as and for the purpose specified.

6. In combination with the clamp A, shaft *f*, and plate *l*, the plates *c* and *g*, clamped together by means of adjusting-screws *g'*, so as to vary the pressure on the clamp A, substantially as set forth.

7. The indicator *n*, constructed substantially as described, and arranged to operate in combination with the clamp A, for the purpose specified.

In testimony that I claim the foregoing I have hereunto set my hand this 26th day of February, 1877.

ERHARD SCHLENKER.

Witnesses:
P. P. BURTIS,
HENRY BULL.